United States Patent
Schmidt, Jr. et al.

[11] Patent Number: 5,398,419
[45] Date of Patent: Mar. 21, 1995

[54] METHODS AND APPARATUS FOR FACILITATING A MEASUREMENT TAKEN FROM A VEHICLE WHEEL AXIS

[75] Inventors: George R. Schmidt, Jr.; James P. Clarke, Jr., both of St. Louis, Mo.

[73] Assignee: Cooper Industries, Inc., Houston, Tex.

[21] Appl. No.: 144,241

[22] Filed: Nov. 1, 1993

[51] Int. Cl.⁶ .................................. G01D 21/00
[52] U.S. Cl. ..................... 33/203; 33/203.18; 33/600
[58] Field of Search ............... 33/203, 203.18, 203.19, 33/203.2, 600, 612, 644, 670, 671

[56] References Cited

U.S. PATENT DOCUMENTS

| | | | |
|---|---|---|---|
| 949,856 | 2/1910 | Stroh | 33/671 |
| 2,190,709 | 2/1940 | Friestedt | 33/203 |
| 2,748,492 | 6/1956 | Lockhart | 33/671 |
| 3,318,010 | 5/1967 | Mahl | 33/671 |
| 3,445,936 | 5/1969 | Wilkerson . | |
| 3,457,653 | 7/1969 | Dick | 33/203.18 |
| 3,686,770 | 8/1972 | Davis . | |
| 3,990,666 | 11/1976 | Morrison et al. . | |
| 4,011,659 | 3/1977 | Horvallius | 33/203 |
| 4,335,519 | 6/1982 | Alsina | 33/203.18 |
| 4,407,073 | 10/1983 | Nilsson et al. . | |
| 4,416,064 | 11/1983 | Hurst . | |
| 4,534,115 | 8/1985 | Kashubara | 33/203.18 |
| 4,800,651 | 1/1989 | Hanlon . | |
| 4,977,524 | 12/1990 | Strege et al. . | |
| 5,027,524 | 7/1991 | Metcalf et al. . | |
| 5,044,090 | 9/1991 | Hunter | 33/203 |
| 5,048,192 | 9/1991 | Pascoal | 33/203.18 |

FOREIGN PATENT DOCUMENTS 0165705 7/1988 Japan ..................... 33/203

Primary Examiner—Thomas B. Will
Attorney, Agent, or Firm—Burns, Doane, Swecker & Mathis

[57] ABSTRACT

In order to check a vehicle for sagged coil springs, vertical distances are measured between the axis of each wheel and a predetermined location on the vehicle body, e.g., the underside of the fender. Those measured distances are compared with established values for that vehicle make and model. To facilitate that measurement a tool is elastically bent and the ends of the tool are mounted by friction-fit against the inside periphery of a wheel rim. The bent tool forms a convex bulge, the apex of which is aligned with the wheel axis and is disposed in or near a vertical plane in which the measurement is to be made. A reference mark provided at the apex of the bulge facilitates a measurement with a ruled tape measure.

16 Claims, 4 Drawing Sheets

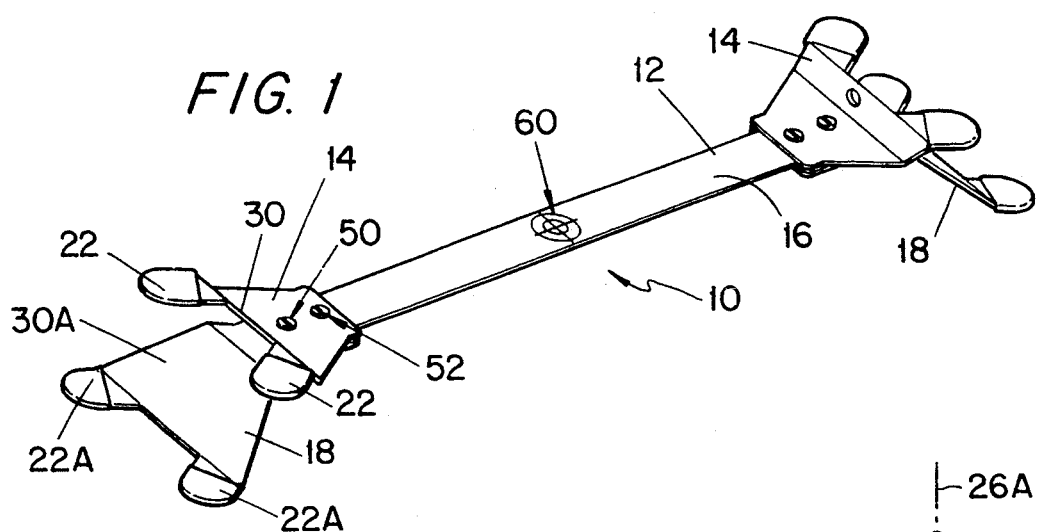
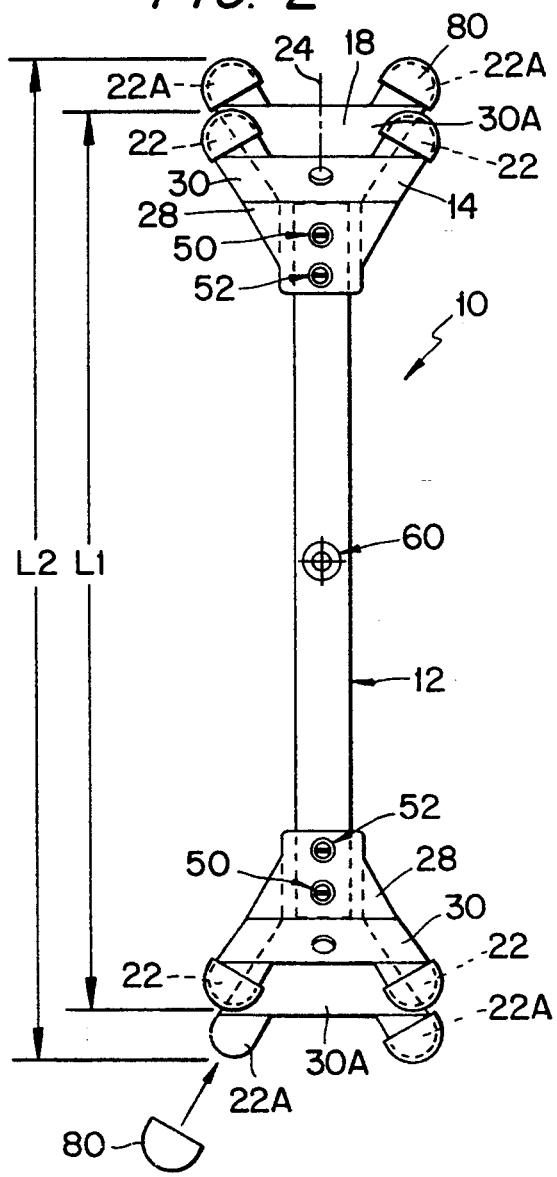
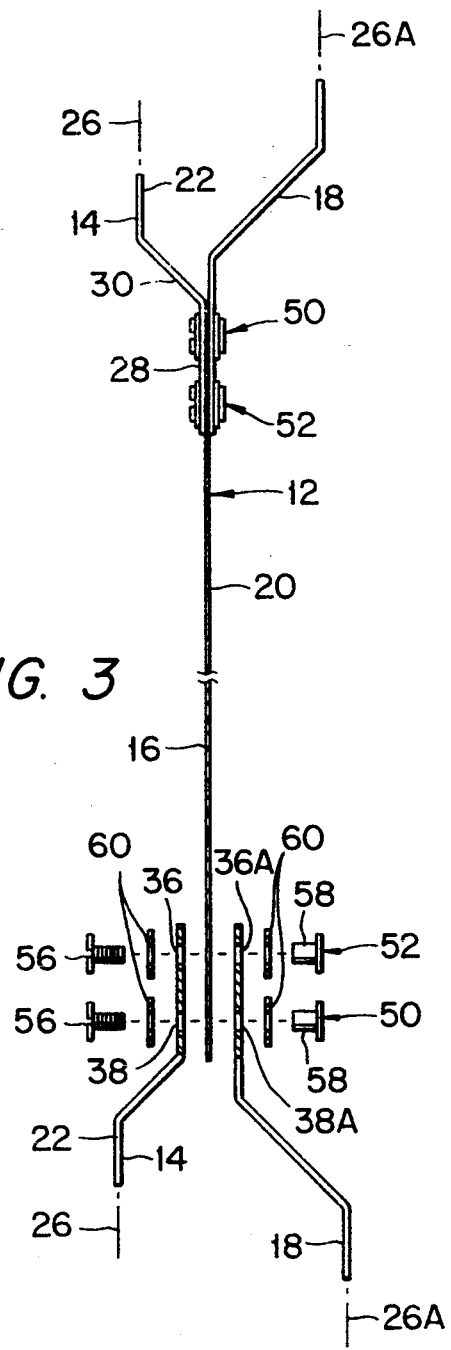
FIG. 1
FIG. 2
FIG. 3

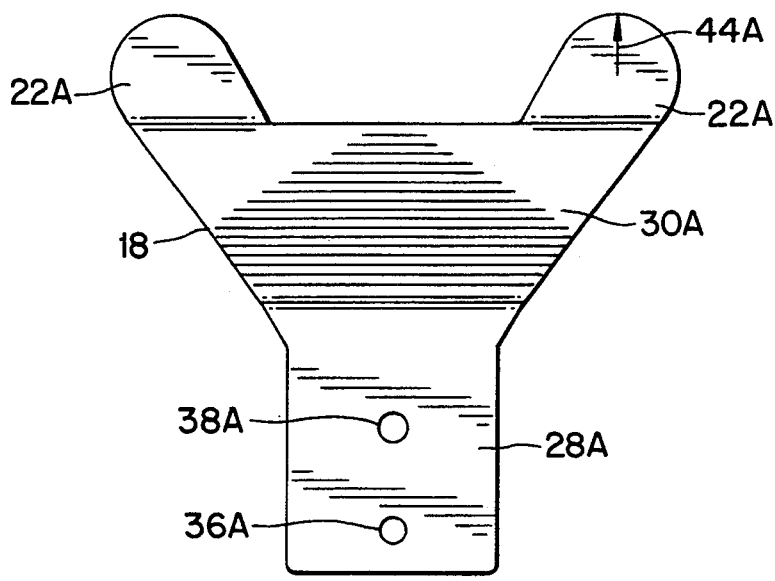
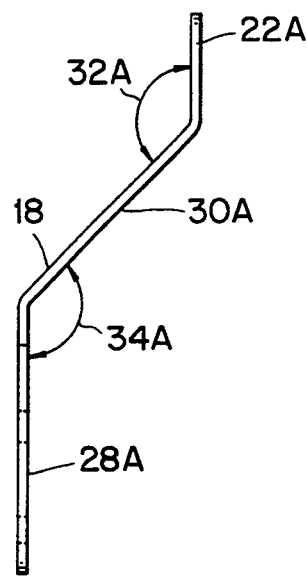
FIG. 4  FIG. 5
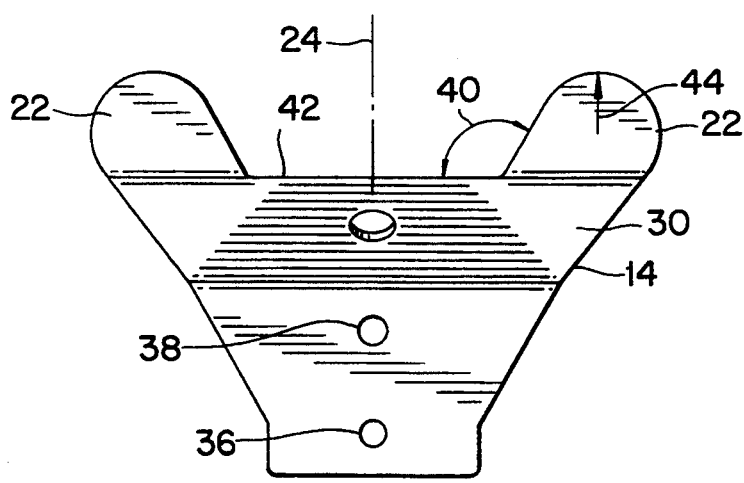
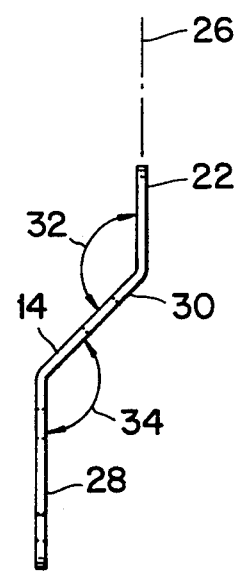
FIG. 6  FIG. 7

METHODS AND APPARATUS FOR FACILITATING A MEASUREMENT TAKEN FROM A VEHICLE WHEEL AXIS

BACKGROUND OF THE INVENTION

The present invention relates to methods and apparatus for facilitating the measurement of a vehicle dimension, in particular a vertical distance between a vehicle wheel axis and the underside of a fender lip of the vehicle.

Among the maintenance checks which are routinely performed on vehicles is a procedure to determine the extent to which the coil springs of the suspension system may have sagged. This procedure, which involves measuring a height dimension of the vehicle, can be performed in various ways as devised by the manufacturer of the particular vehicle. Traditionally, the procedure involves taking vertical measurements between the ground and various points on the vehicle body. Those actual measurements are compared with predetermined values set out in a book of specifications published by the manufacturer, in order to determine to what extent the springs may have sagged. The method of locating the various measuring points on the vehicle can be intricate, making the measurements difficult to obtain and prone to error. This discourages the use of the procedure.

There has been proposed a less complex measuring procedure for checking vehicle height. With reference to FIGS. 11 and 12, that procedure involves measuring a vertical height H from the center axis CA of each wheel W to the underside U of the fender lip E associated with the particular wheel. Those measurements are then compared with predetermined values compiled for the make and model of that vehicle.

However, it is difficult to manually make such a measurement in an accurate manner, due to the horizontal distance D existing between the end of the wheel axle CA and the vertical plane of the fender lip F (see FIG. 12). That is, an operator who orients a ruled measuring element such as a stick or tape so that it extends vertically downwardly from the underside U of the fender lip, cannot accurately determine where the centerline CA of the wheel (i.e., the axis of rotation of the axle) intersects the measuring element. It would, therefore, be desirable to enable measurements of that type to be accurately made in a simple manner.

SUMMARY OF THE INVENTION

The present invention relates to methods and apparatus for measuring a distance between a vehicle wheel axis and a preselected location. The method comprises mounting the ends of an elastically flexible tool to circumferentially spaced places on a rim of a vehicle wheel such that the tool is elastically flexed and forms a convex bulge extending away from the wheel. A reference point disposed at an apex of the bulge is in alignment with an axis of the wheel and disposed adjacent a vertical plane containing the preselected location. A distance between that preselected location and the reference point is then made.

The method also comprises disposing a tool on a vehicle rim such that outer ends of the tool are spring biased outwardly against an inside periphery of the rim to frictionally hold the tool to the rim, such that a reference point disposed at a center of the tool is projected horizontally outwardly with respect to an axle of the wheel and is in alignment with a center axis of the wheel. A distance between the preselected location and the reference point is then made.

An apparatus aspect of the invention involves a tool which is mountable to a vehicle wheel for facilitating the measuring of a distance between a center axis of the wheel and a preselected location. The tool comprises an elastically flexible strip having rim-gripping members at respective ends thereof for frictionally gripping an inside periphery of a wheel rim. The tool, when in a relaxed state, is larger than the rim, requiring that the strip be elastically bent to form a convex bulge in order to fit the rim-members to the rim. The strip includes a reference point disposed at a midpoint thereof so as to be located at an apex of the bulge and in alignment with an axis of the wheel.

Preferably, the rim-gripping members comprise first and second rim-gripping members disposed at each end of the strip on respective sides thereof. Either the first or second rim gripping members are applied to a wheel rim, depending upon the diameter of the wheel rim.

Each rim-gripping member is preferably slightly movable to be able to adjust to the curvature of the wheel rim.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 1 is a perspective view of a tool according to the present invention in a relaxed state;

FIG. 2 is a front elevational view of the tool depicted in FIG. 1;

FIG. 3 is a side elevational view of the tool depicted in FIG. 1, with a lower portion thereof being exploded;

FIG. 4 is a front elevational view of a rim-gripping member according to the present invention for use in measuring larger wheel diameters;

FIG. 5 is a side elevational view of the member depicted in FIG. 4;

FIG. 6 is a front elevational view of a rim-gripping member for use in measuring smaller diameter wheels;

FIG. 7 is a side elevational view of the member depicted in FIG. 6;

DETAILED DESCRIPTION OF A PREFERRED EMBODIMENT OF THE INVENTION

Figure 11:
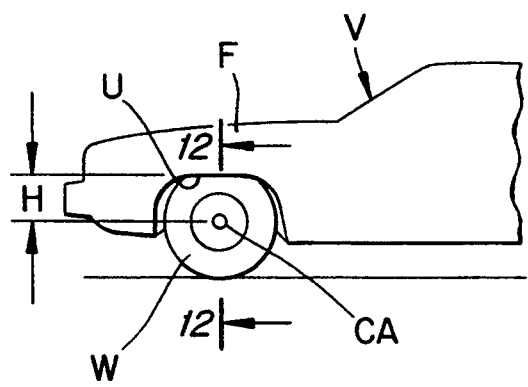
FIG. 11 is a side elevational view of a prior art vehicle wheel.
Figure 12:
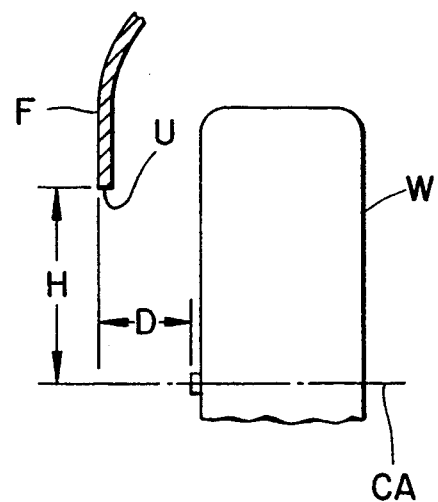
FIG. 12 is a sectional view taken along the line 12—12 in FIG. 11.

Depicted in FIGS. 1–7 is a tool 10 which facilitates the taking of measurements such as the height H from the centerline CA of a vehicle wheel W to the underside U of a fender lip F depicted in FIGS. 11 and 12.

The tool 10 comprises a base 12, a pair of first rim-gripping members 14 mounted at opposite longitudinal ends of a first side 16 of the base 12, and a pair of second rim-gripping members 18 mounted at opposite longitudinal ends of a second side 20 of the base.

The base 12 comprises a thin, elastically bendable strip of material, such as steel. The first and second rim-gripping members can be formed of steel, aluminum, or plastic.

The first rim-gripping members 14 are of identical shape, each comprising a bent bracket which forms a pair of tabs 22 spaced apart laterally with respect to a longitudinal axis 24 of the base (see FIGS. 6 and 7). The tabs 22 lie in a common plane 26 which is spaced from and parallel to a plane of the base 12 when the tool is in a relaxed (non-bent) state as shown in FIG. 3. The tabs 22 are integrally joined to a mounting portion 28 of the bracket by an inclined interconnecting portion 30 (see FIGS. 6 and 7). The plane of the interconnecting portion extends obliquely relative to planes defined by the tabs and mounting portion, respectively. The mounting portion 28 is mounted to the base 12 in a manner to be described. The plane 26 contains the tabs 22 of both of the first rim-gripping members 14, as can be seen in FIG. 3.

The tabs 22 form an obtuse angle 32 with the inclined portion 30 (e.g., 135° 13 see FIG. 7), and the mounting portion 28 forms a similarly sized angle 34 with the intermediate portion 30. A pair of longitudinally spaced holes 36, 38 is formed in the mounting portion 28 for receiving fasteners. An outer one 38 of the holes (i.e. the hole spaced farther from the center of the base) is of larger diameter than the inner one 36 of the holes for a reason to be discussed.

Each tab 22 extends at an obtuse angle 40, e.g., 120° with respect to an edge 42 oriented at ninety degrees with respect to the longitudinal axis 24 of the base (see FIG. 6). Both tabs 22 are radiused along their outer edges, e.g., preferably having a radius of curvature 44 of about 0.4–0.5 inches, most preferably 0.437 inch.

The second rim-gripping members 18 are formed by bent brackets shaped similarly to the first rim-gripping members, and the corresponding elements thereof are designated by similar reference numerals having the suffix "A". The mounting portion 28A and the inclined portion 30A are longer than the corresponding elements 28, 30 of the first rim-gripping member so that the tabs 22A extend farther outwardly than the tabs 22, as can be seen in FIG. 2. For instance, length L1 in FIG. 2 could be about sixteen inches, and length L2 could be about eighteen and one-half inches.

At each end of the base, two fastener assemblies 50, 52 are provided for attaching one of the first rim-gripping members 14 and one of the second rim-gripping members 18 to the base. The fastener assemblies 50, 52 are identical, each including an externally threaded screw 56, an internally threaded sleeve 58 for receiving the screw 56, and a pair of washers 60. The outer fastener assembly 50 passes through the holes 38, 38A of the respective rim-gripping members 14, 18, and the inner fastener assembly 52 passes through the holes 36, 36A. Each screw 56 and associated sleeve 58 are dimensioned so that when the screw is tightened, the rim-gripping members are not tightly pressed against the base, but rather are somewhat loosely mounted thereto. The inner holes 36, 36A have a diameter about the same as the outer diameter of the sleeves 58, whereas the outer holes 38, 38A are of larger diameter than the outer diameter of the sleeves 58 (e.g., by about 0.05 inch) so as to afford a slight amount of pivotal movement of each rim-gripping member about an axis defined by the inner fastener assembly 52 for reasons to be explained.

The midpoint of the base 12 is indicated by a reference means, e.g., a bull's eye 60, disposed on each side 16, 20 of the base.

Figure 8:
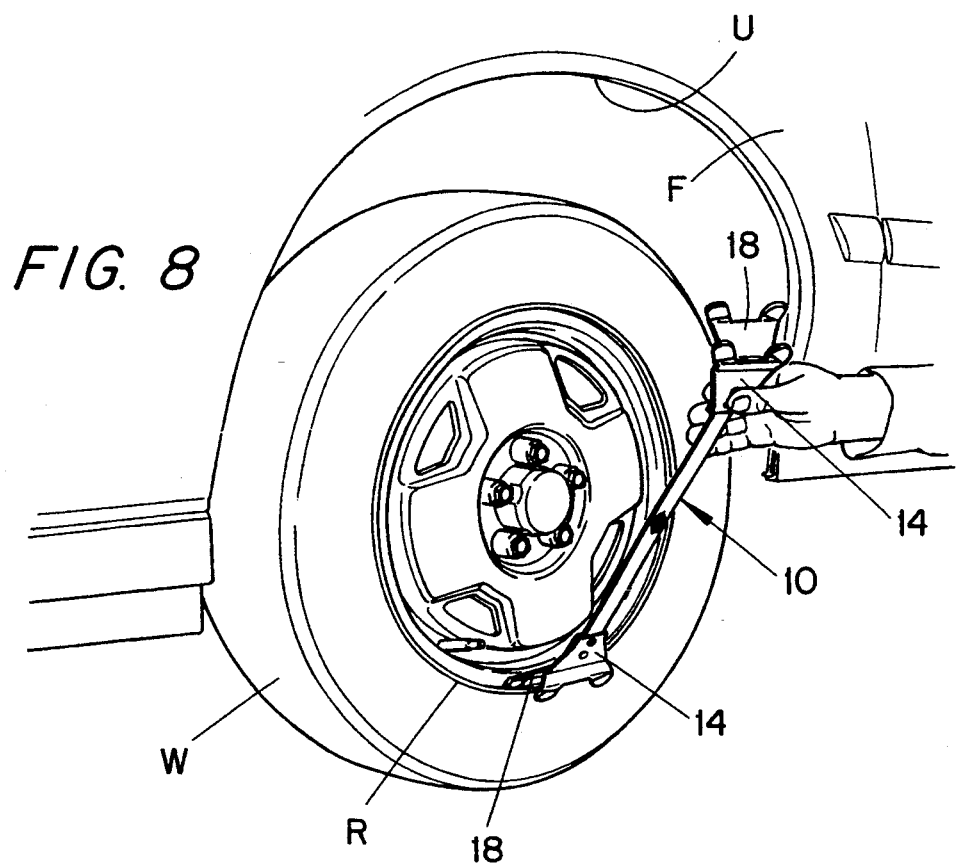
FIGS. 8–10 are perspective views depicting steps involved in the mounting of a tool according to the invention to a vehicle wheel and then making a measurement utilizing the tool.
Figure 9:
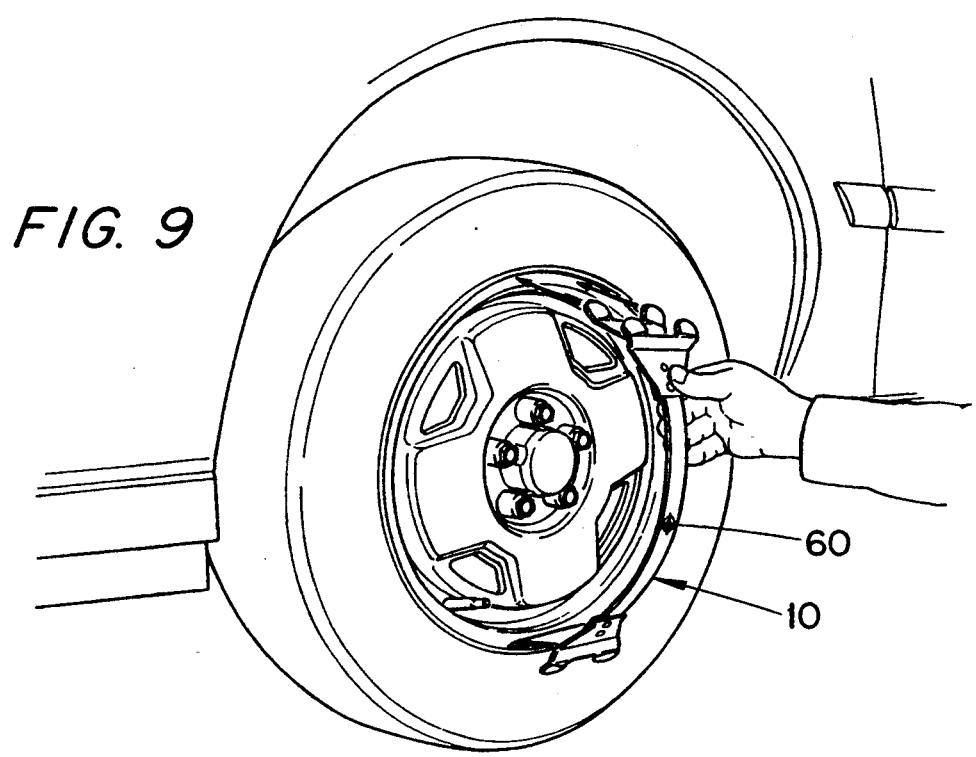
Figure 10:
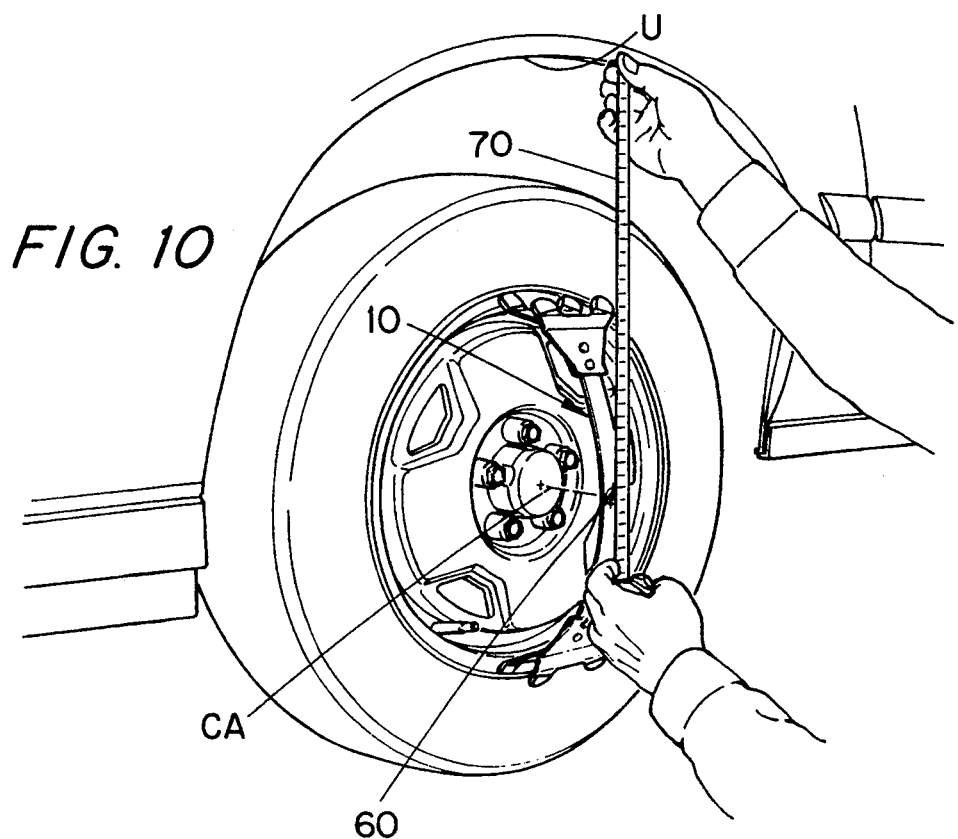

The manner of using the tool 10 is depicted in FIGS. 8-10. The tool 10 is mounted to the rim of a vehicle wheel (after the hub cap—if any—has been removed) by selecting either the first 14 or the second 18 rim-gripping members, depending upon the diameter of the rim. For instance, the first rim-gripping members 14 could be used with 13 and 14 inch wheels, and the second rim-gripping members 18 could be used with 15 and 16 inch wheels. For this example, the second rim-gripping members 18 will be used. With the tool 10 oriented vertically, the tabs 22A of the lowermost one of the second rim-gripping members 18 are inserted inside of the wheel rim R (see FIG. 8). Then, the tabs 22A of the uppermost one of the second rim-gripping members 18 are inserted inside of the wheel rim R at a mounting location spaced diametrically opposite the mounting location of the lowermost second rim-gripping member (see FIG. 9).

The distance between the tabs 22A of the upper and lower ones of the second rim-gripping members, when the tool 10 is in a relaxed state, is greater than the rim diameter, so that the base 12 must be elastically bent in order to enable the tool to be mounted as described above. The tool is thus held by frictional forces established with the rim by the elastic outward restoring force biasing the tool toward its relaxed state. This results in the base 12 forming a convex bulge (see FIG. 10) so that the bull's eye (midpoint) 60 of the base 12, which constitutes the apex of the bulge, coincides with the center axis CA of the wheel and is situated in, or near, a vertical plane in which the underside U of the fender lip lies.

Mounting of the tabs 22A against the inside of the rim is facilitated by the slight amount of movement or "play" of which the rim-gripping members are capable, whereby those members can pivot about the axes of the inner fastener assemblies 52 in order to adjust to any slight misalignment between the tool and the rim curvature.

It may be desirable to provide covers 80 for the tabs 22, 22A (see FIG. 2). Those covers can be formed of plastic and shaped to fit over the respective tabs. The covers serve to increase the frictional forces holding the tool to the rim, and prevent the tabs from scratching the rim. The covers would be removable for easy replacement.

Then, the user orients a linear measuring element, such as a ruled stick or a ruled tape 70, to extend vertically between the underside U of the fender lip and the wheel axis. The point on the measuring element where that element and the bull's eye 60 intersect is then determined, and the vertical distance from the wheel axis to the underside of the fender lip is read from the tape.

The same procedure as described above is performed when the first rim-gripping members 14 are selected for use instead of the second rim-gripping members 18.

The above-described procedure is performed at each wheel of the vehicle, and the resulting measurements are compared with pre-determined specifications for the particular vehicle make and model in order to provide at least an indication as to whether the vehicle height is improper and requires further, more precise checking.

It will be appreciated that the present invention enables a wheel axis to be located in a relatively easy manner, thereby avoiding the need to use more complicated and time-consuming processes. Moreover, by shifting the indicated wheel axis (i.e., the reference mark 60) horizontally to a position oriented in or near the vertical plane of the fender lip underside, the use of a linear measuring element becomes feasible, because the user can easily determine where the wheel axis intersects the measurement element. In sum, the present invention facilitates locating the wheel axis and making a measurement from that axis to another location.

While the above-described procedure involves measuring a vertical distance between the fender lip and wheel axis, it is possible that the procedure could involve measuring other dimensions involving the wheel axis.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A method of measuring a distance between a vehicle wheel axis and a preselected location, comprising the steps of:

mounting ends of an elastically flexible tool to circumferentially spaced places on a rim of a vehicle wheel such that said tool is elastically flexed and forms a convex bulge extending away from the wheel, with a reference means disposed at an apex of said bulge being in alignment with the axis of said wheel, and measuring a distance between said preselected location and said reference means.

2. A method according to claim 1 wherein said mounting step comprises placing said ends of said tool against an inside periphery of said rim such that said tool fictionally grips said rim by means of an elastic outward restoring force biasing said tool toward its relaxed state.

3. A method according to claim 2 wherein said tool comprises a base, and said ends of said tool are defined by respective rim-gripping members mounted on said base for limited rotation relative to said base about a secondary axis extending parallel to said wheel axis, said method further comprising permitting said rim-gripping members to pivot freely about their secondary axes to adjust to slight misalignment between the tool and a curvature of said rim.

4. A method according to claim 2 wherein each end of said tool includes first and second rim-gripping members disposed on respective sides of said tool such that a pair of first rim-gripping members is disposed on the ends of one side of said tool, and a pair of second rim-gripping members is disposed on the ends of a second side of said tool, outer ends of said first ends of said first rim-gripping members being disposed closer to said reference means than outer ends of said second rim-gripping members, said method further comprising, prior to said mounting step, the step of selecting one of said pairs of rim-gripping members to be engaged with said rim in accordance with the size of said rim.

5. A method according to claim 2 wherein said mounting step further comprises mounting said tool vertically on said rim.

6. A method according to claim 5 wherein said measuring step comprises measuring a vertical distance between said reference means and an underside of a fender lip.

7. A method according to claim 1 wherein said reference means is disposed adjacent to a vertical plane containing said preselected location when said tool is mounted to the wheel rim.

8. A tool mountable to a vehicle wheel for facilitating the measuring of a distance between a center axis of the wheel and a preselected location, said tool comprising an elastically flexible strip having rim-gripping means at respective ends thereof for frictionally gripping an inside periphery of a wheel rim, said tool when in a relaxed state, being larger than said rim, requiring that said strip be elastically bent to form a convex bulge in order to fit said rim-gripping means to said rim, said strip including reference means disposed at a midpoint thereof so as to be located at an apex of said bulge and in alignment with the center axis of said wheel.

9. A tool according to claim 8 wherein said rim-gripping means comprises first and second rim-gripping members disposed at each end of said strip on respective sides thereof, so that the first rim-gripping members are disposed on a first side of said strip, and the second rimgripping members are disposed on a second side of said strip, outer ends of said first rim-gripping members being disposed closer to said reference means than outer ends of said second rim-gripping means, whereby said first rim-gripping members are selectively applied to a wheel rim of smaller diameter than a wheel rim to which said second rim-gripping members are applied.

10. A tool according to claim 8 wherein said rim-gripping means comprise rim-gripping members fastened to respective ends of said strip for limited movement relative thereto to enable said rim-gripping members to adjust to slight misalignment between said tool and a curvature of said wheel rim.

11. A tool according to claim 10 wherein each rim-gripping member is slightly rotatable about a secondary axis extending parallel to said wheel axis to provide for said relative movement.

12. A tool according to claim 9 wherein each of the first and second rim-gripping members includes a pair of outwardly projecting tabs having curved outer peripheries for engaging said wheel rim.

13. A tool according to claim 11 wherein each rim-gripping member comprises a mounting portion fastened to said base, and an interconnecting portion connecting said tabs to said mounting portion such that said tabs lie in a plane spaced from a plane defined by said mounting portion.

14. A tool according to claim 13 wherein said interconnecting portion is inclined obliquely relative to both of said planes.

15. A tool according to claim 14 wherein there are first and second rim-gripping members at each end of said strip on respective sides thereof, so that the first rim-gripping members are disposed on a first side of said strip, and the second rim-gripping members are disposed on a second side of said strip, outer ends of said first rim-gripping members being disposed closer to said reference means than outer ends of said second rim-gripping means, whereby said first rim-gripping members are selectively applied to a wheel rim of smaller diameter than a wheel rim to which said second rim-gripping members are applied.

16. A tool according to claim 12 including plastic covers for said tabs to promote frictional retention of said tool on said wheel rim.

* * * * *